(12) United States Patent
Ishii et al.

(10) Patent No.: US 7,271,976 B2
(45) Date of Patent: Sep. 18, 2007

(54) MAGNETIC DISK DRIVE AND METHOD FOR SEEK OPERATIONS WITH REDUCED NOISE

(75) Inventors: Satoshi Ishii, Kanagawa (JP); Tetsuo Ueda, Kanagawa (JP); Isao Yoneda, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/265,004

(22) Filed: Nov. 1, 2005

(65) Prior Publication Data

US 2006/0092549 A1    May 4, 2006

(30) Foreign Application Priority Data

Nov. 2, 2004    (JP)    ............................. 2004-319245

(51) Int. Cl.
G11B 21/02    (2006.01)
(52) U.S. Cl. ...................................................... 360/75
(58) Field of Classification Search .................... None
See application file for complete search history.

(56) References Cited

U.S. PATENT DOCUMENTS 5,309,301 A * 5/1994 Gregory et al. ............. 360/137
5,615,368 A * 3/1997 Terashima et al. .......... 718/101
6,252,737 B1 * 6/2001 Yanagisawa ............. 360/78.06
6,760,175 B2 * 7/2004 Smith .......................... 360/69
6,900,957 B2 * 5/2005 Gillis et al. .................. 360/69

FOREIGN PATENT DOCUMENTS

JP    2003-151229 A    5/2003

* cited by examiner

Primary Examiner—K. Wong
(74) Attorney, Agent, or Firm—Townsend and Townsend and Crew LLP; Patrick Duncan (57) ABSTRACT

Embodiments of the invention reduce the noise occurring when the lubricating layer on the magnetic disk is smoothed. In one embodiment, a magnetic disk drive has a read/write mode parameter table for generating an electric current to be supplied to a voice coil motor when the magnetic head performs data read/write operations on the magnetic disk. The magnetic disk drive also has a smoothing mode parameter table for generating another electric current to be supplied to the voice coil motor when neither a data read nor a write operation is performed on the magnetic disk. The CPU refers to either the read/write mode parameter table or the smoothing mode parameter table and controls the electric current to be supplied to the voice coil motor. When a lubricating-layer smoothing event occurs, the CPU refers to the smoothing mode parameter table and after generating the associated electric current to be supplied to the voice coil motor, moves the magnetic head to seek between the outermost and innermost tracks on the surface of the magnetic disk to perform a smoothing process for the lubricating layer.

20 Claims, 6 Drawing Sheets

| Parameter element | Parameter data |
|---|---|
| Electric current limiter (Peak A) | Maximum permissible current value |
| Electric current variation limiter (ΔA) | Maximum permissible current variation value |
| Deceleration limiter (ΔV) | Maximum permissible acceleration value |
| Maximum speed limiter (Peak V) | Maximum permissible speed value |
| IIR cutoff frequency | High-frequency cutoff frequency value |

MAGNETIC DISK DRIVE AND METHOD FOR SEEK OPERATIONS WITH REDUCED NOISE

CROSS-REFERENCES TO RELATED APPLICATIONS

This application claims priority from Japanese Patent Application No. JP2004-319245, filed Nov. 2, 2004, the entire disclosure of which is incorporated herein by reference.

BACKGROUND OF THE INVENTION

The present invention relates to techniques for reducing noise in magnetic disk drives, and more particularly to a technique for reducing the noise occurring when the waving of the lubricating layer on the surface of a magnetic disk drive is processed.

In magnetic disk drives, magnetic heads for performing data read/write operations on the respective magnetic disks are each installed on an independent suspension assembly and positioned on a desired track by a voice coil motor (VCM). The operation that each magnetic head conducts to move from a track on the magnetic disk to another track is referred to as a seek operation. The magnetic head is formed on a slider having a shape of a rectangular parallelepiped. Hereinafter, the combination of the magnetic head and the slider is referred to as the head/slider. The head/slider has an air-bearing surface (ABS) formed on its face opposed to the magnetic disk. When a viscous air current that has occurred on the surface of the magnetic disk during its rotation flows through a wedge-shaped flow path formed between the ABS and the magnetic disk surface, the air current gives lifting force to the ABS and the head/slider flies upward to a position at which a balance is established between the lifting force and the pressure load applied from the suspension assembly. Hereinafter, the interval between the head/slider and the magnetic disk surface is referred to as flying height.

The head/slider is installed on the suspension assembly so that when the lifting force is given from the viscous air current, the head/slider can flexibly pivot to maintain a desired flying height, even against slight distortion of the magnetic disk. The head/slider is constructed so as usually not to come into contact with the magnetic disk surface. However, internal vibration, external physical shocks, or unstable behavior of the head/slider during the seek operation may cause contact with the magnetic disk surface. In recent years, flying height is further decreasing with the improvement of recording density, and the chance of the head/slider and the magnetic disk surface coming into contact with each other is also increasing.

A lubricating layer is formed on the surface of the magnetic disk since contact between the head/slider and the magnetic disk could lead to wear on or damage to both. In the situation where the head/slider follows a track for a fixed time at almost the same location, the air current flowing between the ABS and the magnetic disk surface pushes the lubricating layer away to its periphery, thus the lubricating layer moving in waves to make the flying height of the head/slider unstable. Patent Document 1 (Japanese Patent Laid-open No. 2003-151229) discloses a technique for activating the seek operation of a slider while monitoring the seek time thereof to prevent a lubricating film from waving. Patent Document 1 teaches that a seek operation not involving a read/write operation is made slower than the seek operation involving a read/write operation. The reasons for this, according to Patent Document 1, are that during a drive idle time, an actuator could collide with a crash stop at high speed in case of accidental electric power cutoff, and that a break-in process for the lubricating film needs to be made valid.

BRIEF SUMMARY OF THE INVENTION

When the head/slider performs the seek operation, noise arises from the VCM, the actuator, or the housing covering these elements. The noise level increases as the seek operation becomes faster. Speeding up the seek operation, however, has an advantage that as the access time to the magnetic disk is correspondingly shortened, this leads to the improvement of performance. Some magnetic disk drives have a high-speed mode that assigns priority to performance, and a low-speed mode that assigns priority to silence. In these devices, prior to shipping from the factory, either mode is preset according to the particular needs of the user, or either mode is user-selected at the user site.

In recent years, as the applications of magnetic disk drives are being diversified, the need has also arisen to provide measures against the occurrence of noise during the seek operation for conducting the smoothing process for the lubricating layer. For example, when a magnetic disk drive is used as a hard-disk drive (HDD) recorder, completion of recording a program may be followed by the start of the seek operation for smoothing down the waving of the lubricating layer. Therefore, users have a desire for reduction of the noise occurring during the seek operation. It is also required to provide an office environment as silent as possible. Accordingly, a feature of the present invention is to reduce noise in magnetic disk drives. Another feature of the invention is to reduce the noise occurring when the waving of the lubricating layer on the surface of a magnetic disk drive is processed.

A first aspect of the present invention provides a magnetic disk drive including: a magnetic disk, a head stack assembly that has a magnetic head for accessing the magnetic disk and is driven by a voice coil motor, a memory adapted to store a first parameter table used for generating an electric current to be supplied to the voice coil motor when the magnetic head performs a user data read or write operation on the magnetic disk, and a second parameter table used for generating another electric current to be supplied to the voice coil motor when neither a user data read nor write operation is performed on the magnetic disk, and a central arithmetic processing unit that refers to either the first parameter table or the second parameter table and generates the associated electric current to be supplied to the voice coil motor; wherein, when a lubricating-layer smoothing event occurs, the central arithmetic processing unit performs a smoothing process for a lubricating layer by referring to the second parameter table, generating the electric current to be supplied to the voice coil motor, and moving the head stack assembly to seek between the outermost and innermost tracks on the surface of the magnetic disk.

A second aspect of the present invention provides a method for performing a seek operation of a magnetic head in a magnetic disk drive, the method including: a first seek step of allowing the magnetic head to process a read/write command by performing the seek operation in response to the electric current to be supplied to a voice coil motor that was generated with reference to a first parameter table including a first permissible value; and a second seek step of allowing the magnetic head to perform the seek operation between the outermost and innermost tracks on a surface of the magnetic disk in response to the electric current to be supplied to the voice coil motor, generated with reference to a second parameter table including a second permissible value smaller than the first permissible value.

According to the present invention, it is possible to reduce noise in magnetic disk drives. According to the invention, it is also possible to reduce the noise occurring when the waving of the lubricating layer on the surface of a magnetic disk drive is processed.

DETAILED DESCRIPTION OF THE INVENTION

Schematic Configuration of a Magnetic Disk Drive

Figure 1:
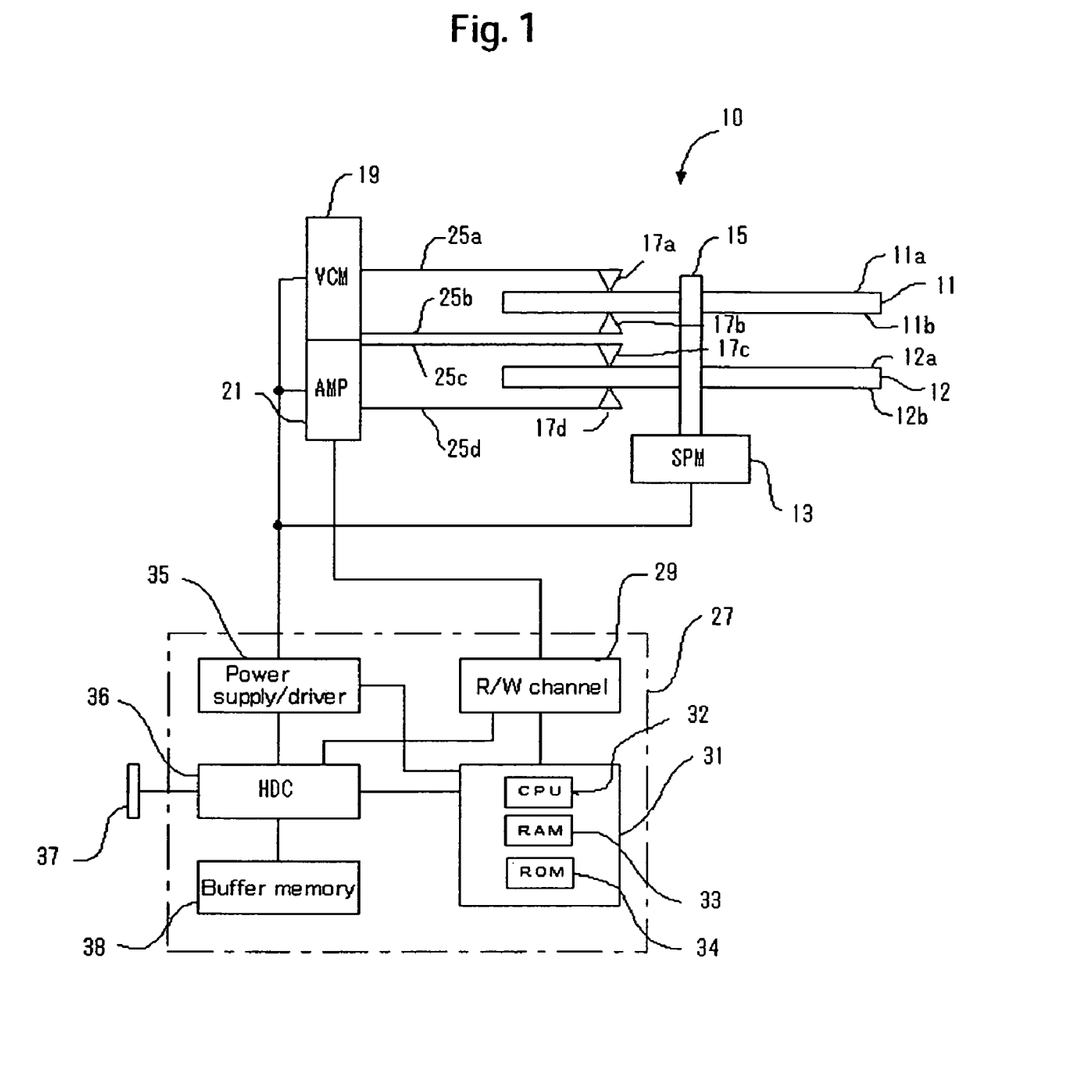
FIG. 1 is a schematic block diagram of the magnetic disk 10 according to an embodiment of the present invention.
Figure 2:
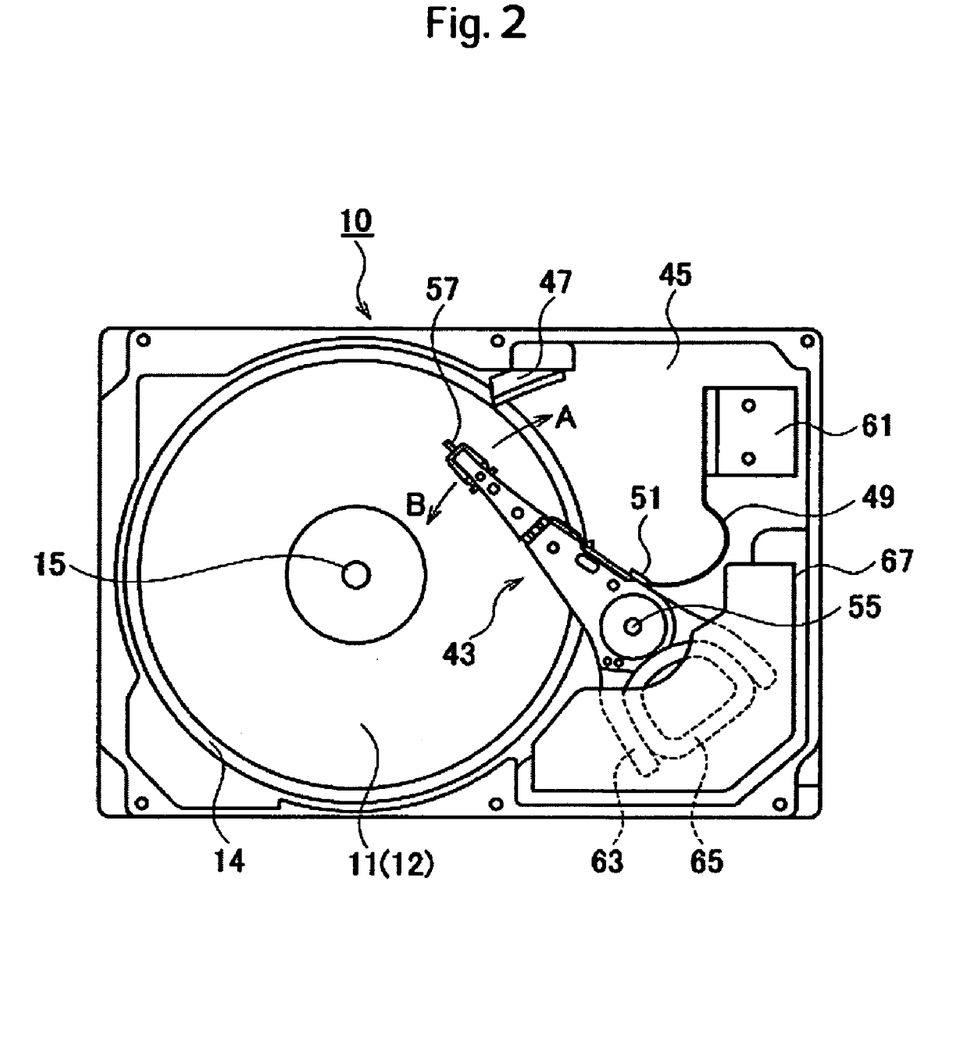
FIG. 2 is a schematic plan view of the magnetic disk 10 according to the above embodiment of the present invention.

FIG. 1 is a schematic block diagram of a magnetic disk drive 10 according to an embodiment of the present invention, and FIG. 2 is a schematic plan view of the magnetic disk drive. Various components of the magnetic disk drive 10 are stored within a base 45 thereof. There are provided two magnetic disks 11 and 12 as recording media; the magnetic disk 11 has recording surfaces 11a and 11b, and the magnetic disk 12 has recording surfaces 12a and 12b. A magnetic layer for recording data is formed on each recording surface, and a protective layer is provided on top of the surface of the magnetic layer. A lubricating layer made of a fluorine-based material, for example, is further formed on the surface of the protective layer. The lubricating layer is in such a state as somewhere in between a liquid and a solid, and tends to move when receiving an air current for a long time via the ABS.

The magnetic disks 11, 12 are fixed to a spindle 15 at required intervals and are both rotated together by a spindle motor (SPM) 13. On each recording surface, a plurality of tracks are concentrically defined using the servo data recorded on servo sectors. The servo sectors are radially arranged so as to be spaced from one another at a fixed angle in a circumferential direction from the innermost track on each recording surface, toward the outermost track thereof. Each set of the servo data includes track position information and a burst pattern, and provides the information intended for a seek operation and a following operation, to a control unit 31.

The magnetic disk drive 10 has four magnetic heads, 17a, 17b, 17c, and 17d, each associated with a corresponding one of the recording surfaces 11a, 11b, 12a, and 12b. Each magnetic head is formed on an associated slider, in the form of a composite head which functions as an inductive magnetic write head and a giant magnetoresistive (GMR) read head. During operation, the four magnetic heads are switched so that either one of them becomes active to access a sector of the address specified from a host computer.

Head/sliders having the respective magnetic heads 17a, 17b, 17c, 17d formed therein are installed at respective ends of head support mechanisms 25a, 25b, 25c, and 25d. Each head support mechanism includes a suspension assembly, a carriage, and a voice coil 65. The voice coil 65 is fixed to an arm 63 that forms part of the carriage. Inside the base 45, a voice coil yoke 67 is installed in such a way as to cover the voice coil 65 from above, and a voice coil magnet is attached to the bottom of the voice coil yoke 67.

The voice coil 65, the voice coil yoke 67, and the voice coil magnet constitute a major section of a voice coil motor (VCM) 19. When seek operation is performed, these constituent elements of the VCM 19 pivot the suspension assemblies or the magnet heads around a pivot 55 in a direction of arrow A or B and position each magnetic head at a required cylinder of the associated magnetic disks. The cylinder refers to the recording region of a cylinder-like shape that is constituted by tracks on the recording surfaces 11a, 11b, 12a, and 12b associated with the magnetic heads 17a, 17b, 17c, and 17d, respectively, when either magnetic head is positioned on a required track. The cylinder, when expressed for one recording surface, can be described as a set of tracks. A combination of one head support mechanism and one head/slider is referred to as a head stack assembly (HSA) 43. A merge lip 57 that engages with a ramp 47 is formed at a tip of the HSA 43.

The head support mechanism has a head amplifier 21 at a relay terminal block 51 for establishing connection between the wiring connected to the magnetic head, and a flexible printed-circuit (FPC) board 49 connected to an external terminal 61. The magnetic disk drive 10 realizes a loading/unloading scheme by having the ramp 47 at a neighboring position external to the periphery of the magnetic disk 11, 12. The ramp 47 is used as a location for the head/slider to be unloaded from the recording surface of the magnetic disk before the SPM 13 is controlled to stop magnetic disk rotation.

The magnetic disk drive 10 has a circuit board 27 on which are mounted a read/write (R/W) channel 29, a control unit 31, a power supply/driver 35, an HDC 36, and a buffer memory 38. The circuit board 27 is installed outside the base 45 and connected to the FPC 49 via the external terminal 61. The R/W channel 29 includes a modulator, a demodulator, a parallel/serial converter, and a variable gain amplifier (VGA). The modulator is adapted to convert data bit strings into the bit strings recorded on the magnetic disk. The demodulator is adapted to reconvert recorded bit strings into original form. The parallel/serial converter is adapted to perform conversions between parallel data and serial data. The variable gain amplifier (VGA) is adapted to adjust read signals to a fixed voltage level. The R/W channel 29 further includes a servo controller that reads servo data and sends the data to the control unit 31.

The control unit 31 includes a central processing unit (CPU) 32, a ROM 34 and a RAM 33. The central processing unit (CPU) 32 conducts total operation control of the magnetic disk drive 10. The ROM 34 is adapted to store various programs and the program causing the CPU 32 to perform a seek operation relating to embodiments of the present invention. The RAM 33 is used for program execution and as a work region. The HDC 36 includes elements such as a buffer controller for controlling the buffer memory 38, and an ECC (error correction code) circuit for generating correction bits for the data bits sent from the host computer, or for correcting the user data read from the magnetic disk. The buffer memory 38 is used to implement high-speed data transfer between the host computer and the magnetic disk drive 10.

The power supply/driver 35 includes an SPM driver for supplying an operating current to the SPM 13, a VCM driver for supplying an operating current to the voice coil of the VCM 19, a DA converter, and a power supply circuit. The circuit board 27 has an interface connector 37 for connecting the magnetic disk drive 10 to the host computer.

Block Diagram of a Speed Control System

Figure 3:
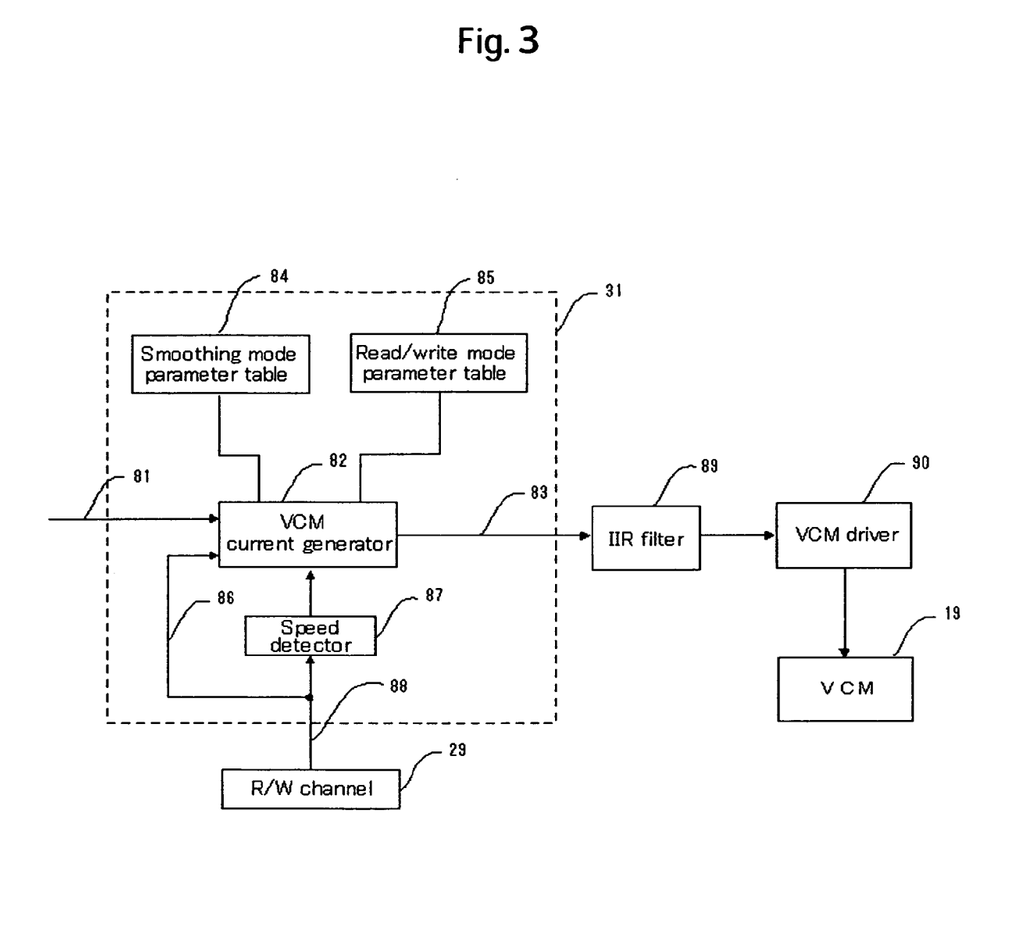
FIG. 3 is a schematic block diagram of the seek operation control system according to an embodiment of the invention.

FIG. 3 is a schematic block diagram of a seek operation control system of the HSA 43. The seek operation control system includes the control unit 31, an IIR filter 89, a VCM driver 90, the VCM 19, and the R/W channel 29. An internal control system of the control unit 31 includes a VCM current generator 82, a speed detector 87, a smoothing mode parameter table 84 (hereinafter, referred to simply as the parameter table 84, as appropriate), and a read/write mode parameter table 85 (hereinafter, referred to simply as the parameter table 85, as appropriate). These elements are constituted as the programs and data stored within special regions of the ROM 34 or of the magnetic disk. Parameter data for generating a VCM current to be supplied to VCM during seek operation is stored in the parameter tables 84 and 85. These parameter tables 84, 85 are detailed later.

The VCM current generator 82 receives position information of the target track specified by an internal program of the host computer or of the magnetic disk, through a line 81, and receives position information of a current track of the magnetic head through a line 86. Furthermore, the VCM current generator receives speed information of the HSA 43 from the speed detector 87 and outputs a digital VCM current to the IIR filter 89 through a line 83. The VCM current generator 82 is adapted to select either the read/write mode parameter table 85 or the smoothing mode parameter table 84. More specifically, when generating the VCM current, the VCM current generator refers to the parameter table 85 to make the HSA 43 conduct a seek operation for processing the read/write command sent from the host computer, or refers to the parameter table 84 to make the HSA 43 conduct a seek operation for executing a smoothing event.

The VCM current generator 82 extracts a standard speed from the standard speed table set up as standard for positions of the target track and the current track beforehand, compares the standard speed with the current speed information supplied from the speed detector 87, and generates a digital VCM current for narrowed difference between the standard speed and the current speed. In contrast to the VCM current generator, the data stored in the parameter tables 84, 85 slows down the seek operation of the HSA 43 by imposing fixed limitations on the VCM current. Since parameter data within the parameter table 85 is intended for the CPU 32 to make reference when it processes a read/write command for which desired performance is required, the parameter data is constructed so that the seek operation can be completed within the shortest possible time. The parameter data, therefore, imposes almost no limitations on the VCM current generated by the standard speed table. Conversely, parameter data within the parameter table 84 exerts various limitations on the VCM current generated by the standard speed table, in order to make the HSA 43 conduct the seek operation at low speed to minimize noise when a smoothing event occurs. Further details of the two types of parameter data are described later together with details of the parameter tables themselves.

The servo controller of the R/W channel 29 extracts track information that has been read by the read head, and sends the information to the speed detector 87 and the VCM current generator 82. Since servo data is discretely recorded in a circumferential direction of each track, the track position information indicating where the magnetic disk exists at a particular time of the day is output from the servo controller at a sampling period determined by a rotating speed of the magnetic disk and a layout of servo sectors. The speed detector 87 calculates a moving speed of the HSA 43 from the track position information and time information received from the R/W channel 29, and sends calculation results to the VCM current generator 82.

The IIR filter 89 is a digital filter that realizes an infinite impulse response system capable of setting a high-frequency cutoff frequency. In the present invention, an analog filter can also be used to cut a high-frequency band of the VCM current. The VCM current generator 82 refers to the parameter data of the parameter tables 84, 85 and sets the high-frequency cutoff frequency for the IIR filter 89. The IIR filter 89 reduces a gain of the high-frequency components included in the digital signal generated by the VCM current generator 82, and then sends the digital signal to the VCM driver 90. The VCM driver 90, after receiving the digital signal from the IIR filter 89, converts the signal into an analog signal and further converts the analog signal into the electric current actually supplied to the voice coil of the VCM 19.

Structure of VCM Tables

Next, the parameter tables are described below with reference to FIG. 4. The parameter tables 84, 85 in FIG. 3 are stored into the special recording regions for the system that are not used for recording user data, and data is read out from these tables into the RAM 33 when the magnetic disk drive 10 starts operating. FIG. 4(A) is a parameter table structural diagram. FIG. 4(B) is an explanatory diagram of parameter elements, showing an example in which the VCM current changes when the HSA 43 is seeking between tracks. During the seek operation, when the CPU 32 moves the magnetic head to a target track position spaced from a starting track position by a desired number of tracks, the CPU gradually increases the supply current to the VCM 19, typically during an initial stage of the seek operation. After the VCM current has reached its desired peak value "Peak A", the CPU retains this value for a fixed time, then reduces the value progressively, and supplies a minus current to brake the HSA 43 that rotates. After the HSA 43 has moved close to the target track, the CPU 32 changes a control mode from speed control to position control and positions the magnetic head in the center of the track by using a signal for reading the burst pattern included in the servo data.

Figure 4:
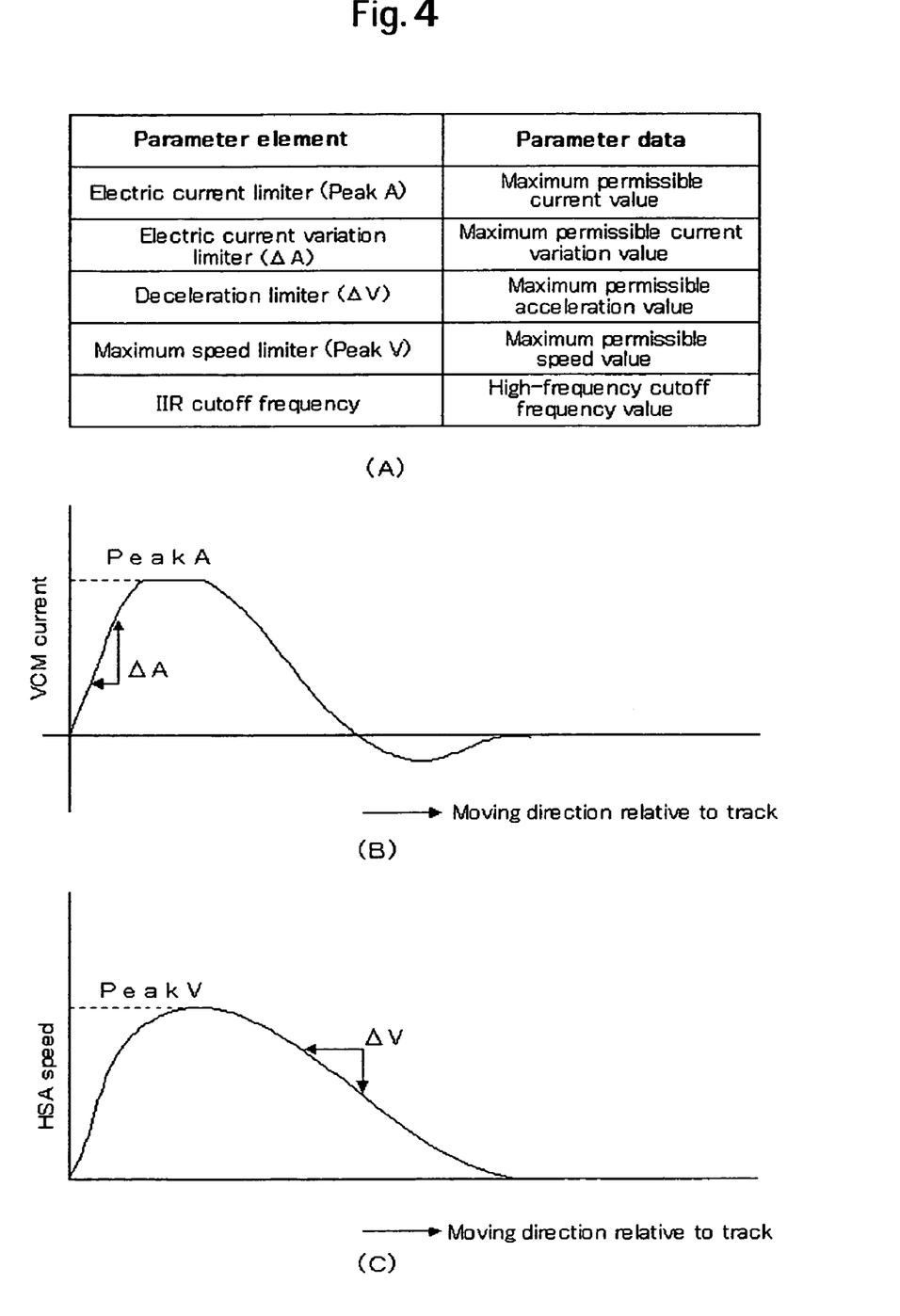
FIG. 4 is a diagram explaining the parameter table structure.

FIG. 4(C) is an explanatory diagram of parameter elements, showing the changes in a seek speed of the HSA 43 that occur when the VCM current shown in FIG. 4(B) is supplied to the voice coil of the VCM 19. In the present embodiment, although both the parameter tables 84, 85 include the five parameter elements listed in FIG. 4(A), and are of the same structure, parameter data differs between them. However, since the parameter table 84 is adaptable to store the parameter data to be used for a smoothing process during the seek operation, this table does not always need to include the same parameter elements as those of the parameter table 85.

Electric current limiter "Peak A", as shown in FIG. 4(B), defines a maximum permissible current value for the electric current that can be supplied to the VCM. Reducing the value of the electric current limiter "Peak A" reduces an acceleration of the HSA 43, allowing reduction in seek noise level when the HSA 43 is accelerated. Electric current variation limiter ΔA, as shown in FIG. 4(B), is a maximum permissible variation in VCM current level per sampling period of the servo data or per unit time. Reducing the value of the electric current variation limiter ΔA reduces the acceleration of the HSA 43 during the seek operation, allowing reduction in noise due to variations in the acceleration of the HSA 43. The electric current limiter and the electric current variation limiter are parameter elements concerning the VCM current.

Deceleration limiter ΔV is a maximum permissible minus acceleration value that indicates, as shown in FIG. 4(C), a maximum permissible change in a speed of the HSA 43 when it enters a deceleration mode. In this specification, deceleration limiter ΔV has its sign ignored and is expressed as an absolute value. Reducing the value of the deceleration limiter ΔV generates the VCM current correspondingly limited, and allows reduction in seek noise level when the HSA 43 is decelerated. Maximum speed limiter "Peak V" defines a maximum seek speed of the HSA 43. Reducing the value of the maximum speed limiter generates the VCM current correspondingly limited, and allows reduction in the noise arising from the HSA 43 when it operates to seek at its maximum speed.

An IIR cutoff frequency provides for a high-frequency cutoff frequency of the VCM current, and when the IIR filter 89 is set, high-frequency components of the VCM current are removed to suppress vibration of the HSA 43 during the seek operation. When the cutoff frequency is reduced in value, frequency components of a high-frequency band are further removed from the VCM current and noise due to the vibration of the HSA 43 is reduced. However, performance deteriorates since the seek speed decreases.

Although the parameter table 84 and the parameter table 85 are constructed of the same parameter elements, parameter data of each parameter element is smaller in the parameter 84 than in the parameter table 85. Consequently, when referring to the parameter table 84, the VCM current generator 82 generates the VCM current limited by each parameter element, and can easily achieve slower seek operation than in read/write mode. In addition, when the HSA 43 seeks, noise occurs under specific conditions in an acceleration region, a constant-speed region, and a deceleration region each. The noise reduction measures each matching a characteristic nature of the magnetic disk drive can, therefore, be realized by setting appropriate parameter data in the parameter table 84.

Figure 6:
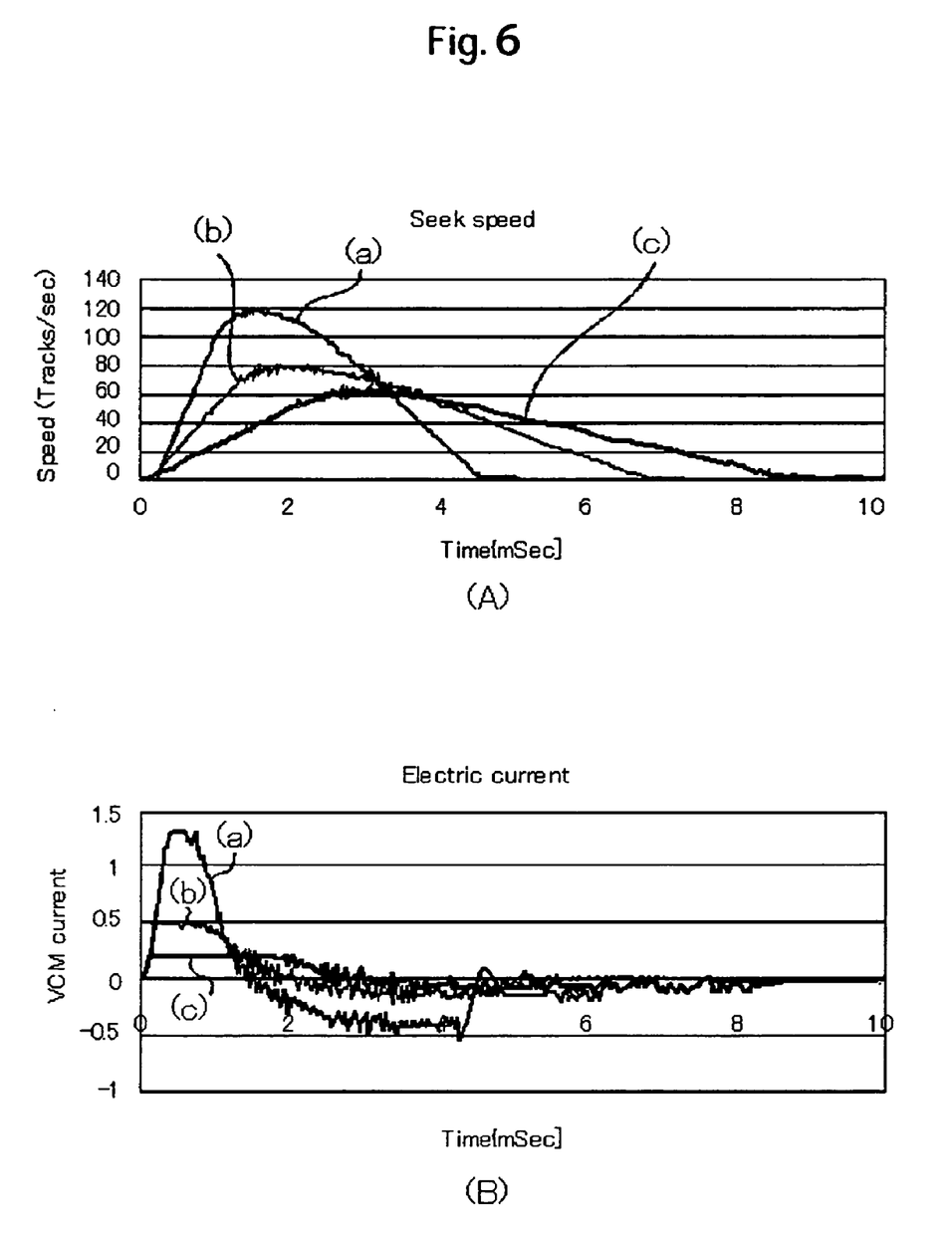
FIG. 6 shows the changes in the speed of the HSA 43 and changes in VCM current level that occur when the HSA seeks for 10,000 tracks by applying the parameter tables.

The changes in the speed of the HSA 43 and changes in VCM current level that occur when the HSA seeks for 10,000 tracks by applying the parameter tables are shown in FIGS. 6(A) and 6(B), respectively. Line (a) indicates the changes in seek speed with reference to the parameter table 85, and line (c) indicates those of the seek speed with reference to the parameter table 84. Line (b) relates to a case in which parameter elements are set to take data somewhere in between parameter element data of the parameter tables 84 and 85. That is to say, line (b) indicates a state in which the seek speed, seek acceleration, or the like does not decrease to such an extent that the noise occurring during the seek operation for smoothing is sufficiently reduced.

Procedure for Conducting the Smoothing Process

Figure 5:
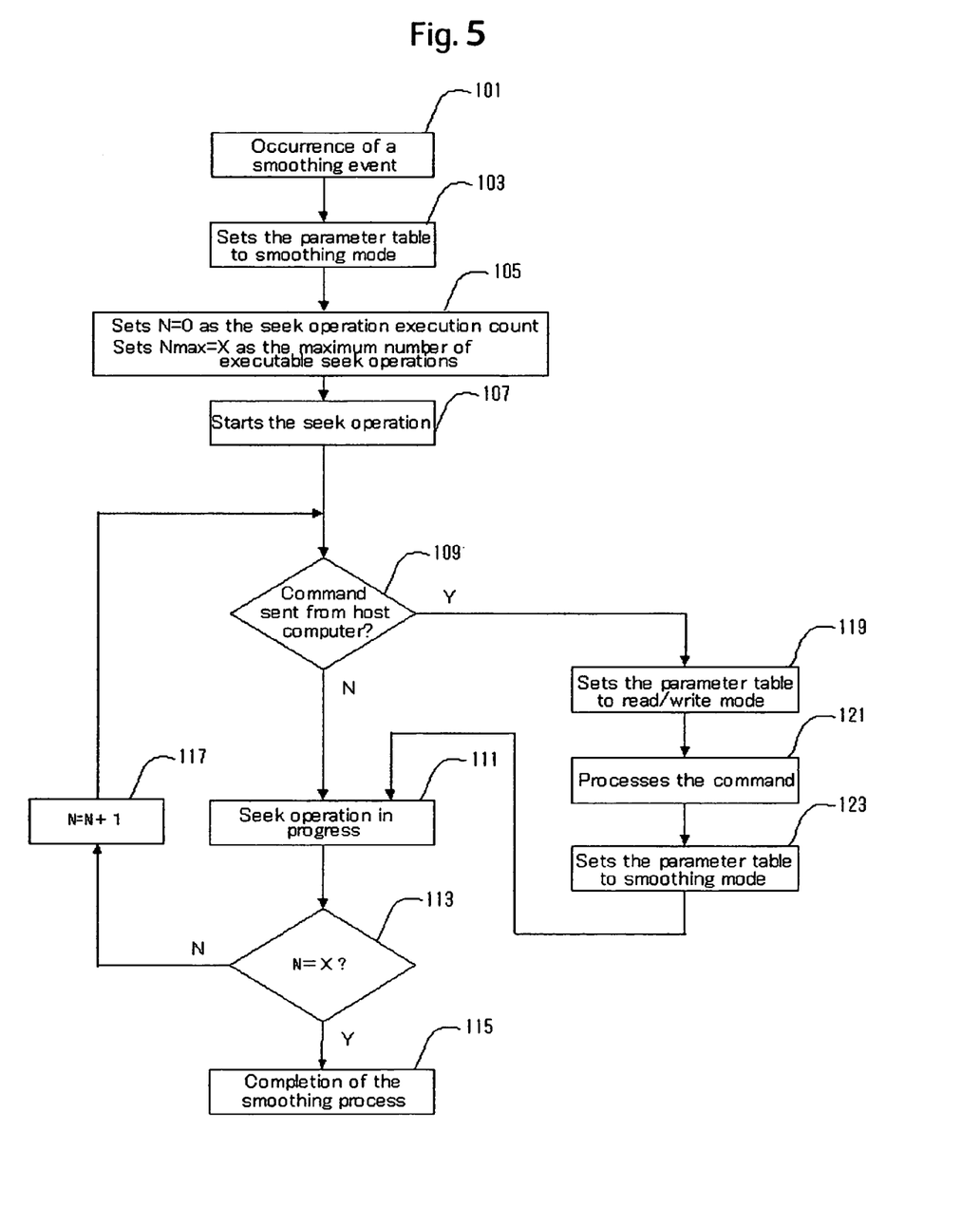
FIG. 5 is a flowchart setting forth the procedure for executing the smoothing process according to an embodiment of the invention.

Next, a procedure for conducting the smoothing process for the lubricating layer is set forth below. FIG. 5 is a flowchart setting forth the smoothing procedure. The magnetic disk drive 10 is connected to a video camera device or HDD recorder as the host computer in order to record acquired images or television programs or the like. Block 101 is a step in which a smoothing event occurs. The interior of the magnetic disk drive or the host computer generates the smoothing event in the timing that a waving motion of the lubricating layer on the ABS-facing magnetic disk needs to be smoothed with the head/slider positioned at the desired position on the magnetic disk for a long-time.

As its first example, the event occurs in the state where the magnetic head flies over a specific track on the rotating magnetic disk for a required time or more because of a read/write command not being sent from the host computer. In this example, an elapsed time from execution of the previous read/write command is measured and when the required time elapses, the event is generated.

As its second example, the event occurs in the state where, although the read/write command is periodically sent from the host computer, the magnetic head stays within a range of a desired number of contiguous tracks present in a region having about twice a width of the slider for a required time or more. This state occurs in, for example, the application where, for a change-free static image as in an ATM surveillance camera, only a type stamp is updated using the same image data.

As its third example, the event occurs in accordance with desired time information. The time information can be the same time of the day on a daily basis or the day of a week that is set in conjunction with a time of the day. For an HDD recorder or the like, a time zone in which noise due to the smoothing process will be of a minimum offensive level to a user can be set as the time information. A fourth example of the event is based on a host computer command, in which example, the host computer can determine appropriate timing of smoothing.

In block 103, the CPU 32 changes the type of parameter table to be used to generate the VCM current, from the read/write mode parameter table 85 to the smoothing mode parameter table 84. Subsequently, when the HSA 43 conducts the seek operation, the control unit 31 refers to the parameter table 84 and generates the VCM current.

In block 105, the CPU 32 resets an execution count of seek operations up to now, to 0. The CPU 32 further sets X as a maximum number of executable seek operations, "Nmax", where X is a maximum number of one-way movements of the magnetic head from the outermost track on the surface of the magnetic disk to the innermost track, or vice versa. Any value from 1 to 30 can be selected as appropriate. The value of X is related to details of the smoothing event. For example, 1 can be selected as the value of X to generate the event in the state where the magnetic head stays within a range of a desired number of contiguous tracks for about 10 minutes. About 30 can be selected to generate the event once a week.

In block 107, the seek operation for smoothing is started. When the magnetic head at the time of start of the seek operation is present at a position other than the outermost track, the magnetic head is temporarily returned to the outermost track and then positioned on the innermost track to start seeking. To refer to the parameter table 84 and seek for tracks from the outermost track to the innermost one, the magnetic head requires three to four seconds by way of example. During this period, the CPU 32 monitors for a command from the host computer, in step 109. If a command is not sent from the host computer, the seek operation is continued in step 111 and a total number of seek operations up to completion of that seek operation is counted as N in step 113. When the seek operation count N reaches X, control proceeds to block 115 to complete the smoothing process.

If the seek operation count N in block 113 is less than X, the CPU 32 sets N=N+1 in block 117 and after returning to block 109, continues the residual seek operations while monitoring for a command from the host computer. When a command is sent from the host computer in block 109 and processing priority is to be assigned to the command, the CPU 32 interrupts the seek operation being executed for the smoothing process and then transfers control to block 119. At this time, the CPU 32 stores into the RAM 33 the seek operation count N and track position information detected when the seek operation was interrupted.

In block 119, the parameter table has its setting changed to the read/write mode parameter table 85, and in block 121, the command is processed. Following this, a setting change of the parameter table to the smoothing mode parameter table 84 is conducted in block 123 and the seek operation is restarted from block 111. At this time, the CPU 32 reads out from the RAM 33 the information existing when the seek operation was interrupted, and conducts the seek operations succeeding those which have been completed by that time. When smoothing is to take priority over the host computer command, blocks 109, 119, 121, and 123 are not required. As a result, the seek operation for smoothing can be easily conducted just by changing the parameter table, and thus the noise occurring during the seek operation can be easily reduced.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive, comprising:
   a magnetic disk;
   a head stack assembly with a magnetic head for accessing said magnetic disk, said assembly being driven by a voice coil motor;
   a memory adapted to store a first parameter table used for generating an electric current to be supplied to the voice coil motor when the magnetic head performs a user data read or write operation on said magnetic disk, and a second parameter table used for generating another electric current to be supplied to the voice coil motor during a seek operation when neither a user data read nor a write operation is performed on said magnetic disk; and
   a central processing unit which refers to either the first parameter table or the second parameter table and generates the associated electric current to be supplied to the voice coil motor;
   wherein when a lubricating-layer smoothing event occurs, said central processing unit performs a smoothing process for a lubricating layer by referring to the second parameter table, generating the associated electric current to be supplied to the voice coil motor, and moving said head stack assembly to seek between outermost and innermost tracks on a surface of said magnetic disk,
   wherein the first parameter table includes a first parameter element having a first permissible value, and wherein the second parameter table includes the first parameter element having a second permissible value that is smaller than the first permissible value.

2. The magnetic disk drive according to claim 1, wherein the second parameter table includes a maximum permissible current value of the associated electric current to be supplied to the voice coil motor, and a maximum permissible variation value per unit time, of the associated electric current to be supplied to the voice coil motor.

3. The magnetic disk drive according to claim 1, wherein the second parameter table includes a maximum permissible acceleration value of said head stack assembly and a maximum permissible speed value thereof.

4. The magnetic disk drive according to claim 1, wherein the second parameter table includes a high-frequency cutoff frequency that is used by a filter through which the associated electric current supplied to the voice coil motor flows.

5. The magnetic disk drive according to claim 1, wherein the lubricating-layer smoothing event represents occurrence of a state in which the magnetic head stays within a range of a desired number of contiguous cylinders for a desired time.

6. The magnetic disk drive according to claim 1, wherein the lubricating-layer smoothing event represents occurrence of desired time-of-the-day information.

7. The magnetic disk drive according to claim 1, wherein the lubricating-layer smoothing event represents issuance of a command from a host computer.

8. The magnetic disk drive according to claim 1, wherein, after receiving a read command or a write command from the host computer while performing the smoothing process, said central processing unit first processes the read command or the write command by interrupting an ongoing seek operation, storing interruption information into a memory, referring to the first parameter table after storage of the interruption information, and generating the associated electric current to be supplied to the voice coil motor, and then performs a residual seek operation in accordance with the interruption information by referring to the second parameter table and generating the associated electric current to be supplied to the voice coil motor.

9. The magnetic disk drive according to claim 1, wherein the first parameter table and the second parameter table each include a specific maximum permissible current value of the associated electric current to be supplied to the voice coil motor, and a specific maximum permissible variation value per unit time, of the associated electric current to be supplied to the voice coil motor, and wherein the maximum permissible current value and maximum permissible variation value per unit time that are included in the second parameter table are smaller than the maximum permissible current value and maximum permissible variation value per unit time, respectively, of the first parameter table.

10. The magnetic disk drive according to claim 1, wherein the first parameter table and the second parameter table each include a specific maximum permissible acceleration value of said head stack assembly and a specific maximum permissible speed value thereof, and wherein the maximum permissible acceleration value and maximum permissible speed value that are included in the second parameter table are smaller than the maximum permissible acceleration value and maximum permissible speed value, respectively, of the first parameter table.

11. A method for performing a seek operation of a magnetic head in a magnetic disk drive which is driven by a voice coil motor, said method comprising:
   allowing the magnetic head to process a read/write command by performing a first seek operation according to a supply current to the voice coil motor that is generated with reference to a first parameter table including a first parameter element having a first permissible value; and in response to a lubricating-layer smoothing event, allowing the magnetic head to perform a second seek operation between the outermost and innermost tracks on a surface of magnetic disk according to the supply current to the voice coil motor that is generated with reference to a second parameter table including the first parameter element having a second permissible value that is smaller than the first permissible value.

12. The method for performing a seek operation according to claim 11, wherein said second seek operation is staffed with the magnetic head staying within a range of a desired number of contiguous tracks for a desired time.

13. The method for performing a seek operation according to claim 11, said method further comprising:

storing an interruption state of said second seek operation by receiving a read command or a write command from a host computer while said second seek operation is being executed, and interrupting said second seek operation;

processing the read command or the write command; and executing residual portions of said interrupted second seek operation according to the supply current to the voice coil motor that is generated with reference to the second parameter table.

14. The method for performing a seek operation according to claim 11, wherein the second parameter table includes parameter elements concerning the current to be supplied to the voice coil motor.

15. The method for performing a seek operation according to claim 11, wherein the second parameter table includes parameter elements concerning a speed at which the magnetic head moves.

16. The method for performing a seek operation according to claim 11, wherein the second parameter table includes a maximum permissible current value of the associated current to be supplied to the voice coil motor, and a maximum permissible variation value per unit time, of the associated current to be supplied to the voice coil motor.

17. The method for performing a seek operation according to claim 11, wherein the second parameter table includes a maximum permissible acceleration value of said head and a maximum permissible speed value thereof.

18. The method for performing a seek operation according to claim 11, wherein the second parameter table includes a high-frequency cutoff frequency that is used by a filter through which the associated current supplied to the voice coil motor flows.

19. The method for performing a seek operation according to claim 11, wherein the first parameter table and the second parameter table each include a specific maximum permissible current value of the associated current to be supplied to the voice coil motor, and a specific maximum permissible variation value per unit time, of the associated current to be supplied to the voice coil motor, and wherein the maximum permissible current value and maximum permissible variation value per unit time that are included in the second parameter table are smaller than the maximum permissible current value and maximum permissible variation value per unit time, respectively, of the first parameter table.

20. The method for performing a seek operation according to claim 11, wherein the first parameter table and the second parameter table each include a specific maximum permissible acceleration value of said head and a specific maximum permissible speed value thereof, and wherein the maximum permissible acceleration value and maximum permissible speed value that are included in the second parameter table are smaller than the maximum permissible acceleration value and maximum permissible speed value, respectively, of the first parameter table.

* * * * *

UNITED STATES PATENT AND TRADEMARK OFFICE
CERTIFICATE OF CORRECTION

PATENT NO. : 7,271,976 B2  
APPLICATION NO. : 11/265004  
DATED : September 18, 2007  
INVENTOR(S) : Ishii et al.

Page 1 of 1

It is certified that error appears in the above-identified patent and that said Letters Patent is hereby corrected as shown below:

In the Claims:
Claim 12, Column 11, Line 13, please delete "staffed" and insert --started--.

Signed and Sealed this

Thirteenth Day of May, 2008

JON W. DUDAS  
*Director of the United States Patent and Trademark Office*